US008453241B2

(12) United States Patent  (10) Patent No.: US 8,453,241 B2
Davids et al.  (45) Date of Patent: May 28, 2013

(54) METHOD FOR SECURING STREAMING MULTIMEDIA NETWORK TRANSMISSIONS

(75) Inventors: Carol Davids, Lisle, IL (US); Gary Dorst, Chicago, IL (US); Ken Kousky, Freeland, MI (US); Gene Yahnes, Niles, IL (US)

(73) Assignee: Illinois Institute of Technology, Chicago, IL (US)

( * ) Notice: Subject to any disclaimer, the term of this patent is extended or adjusted under 35 U.S.C. 154(b) by 845 days.

(21) Appl. No.: 11/641,375

(22) Filed: Dec. 18, 2006

(65) Prior Publication Data

US 2008/0148405 A1 Jun. 19, 2008

(51) Int. Cl.
*H04L 9/00* (2006.01)
*G06F 11/30* (2006.01)

(52) U.S. Cl.
USPC ............... 726/23; 726/13; 726/22; 726/27

(58) Field of Classification Search
USPC ............... 726/23, 2–4, 11–13, 22, 27, 30
See application file for complete search history.

(56) References Cited

U.S. PATENT DOCUMENTS

| | | | |
|---|---|---|---|
| 4,558,302 A | 12/1985 | Welch | |
| 5,313,637 A | 5/1994 | Rose | |
| 6,145,081 A | 11/2000 | Winograd et al. | |
| 6,404,822 B1 * | 6/2002 | Ben-Michael et al. | 375/296 |
| 6,405,338 B1 | 6/2002 | Sinha et al. | |
| 6,654,887 B2 | 11/2003 | Rhoads | |
| 6,675,146 B2 | 1/2004 | Rhoads | |
| 6,678,389 B1 | 1/2004 | Sun et al. | |
| 6,785,261 B1 * | 8/2004 | Schuster et al. | 370/352 |
| 6,931,451 B1 | 8/2005 | Logan et al. | |
| 6,937,730 B1 | 8/2005 | Buxton | |
| 7,137,070 B2 | 11/2006 | Brown et al. | |
| 7,315,537 B2 * | 1/2008 | Klaghofer et al. | 370/352 |
| 7,529,187 B1 * | 5/2009 | Hernacki et al. | 370/230 |
| 7,716,725 B2 * | 5/2010 | Xie | 726/11 |
| 7,958,347 B1 | 6/2011 | Ferguson | |
| 7,970,013 B2 | 6/2011 | Sinha et al. | |
| 8,045,457 B1 * | 10/2011 | Satish et al. | 370/230 |
| 2003/0043740 A1 * | 3/2003 | March et al. | 370/229 |
| 2004/0121764 A1 | 6/2004 | Rivero | |
| 2004/0193881 A1 | 9/2004 | Ayaki et al. | |
| 2005/0020208 A1 | 1/2005 | Gregori | |
| 2005/0114665 A1 | 5/2005 | Shim et al. | |
| 2005/0120243 A1 * | 6/2005 | Palmer et al. | 713/201 |

(Continued)

OTHER PUBLICATIONS

Prasad et al., Deployment Issues of a VoIP Conferencing System in a Virtual Conferencing Environment, Oct. 2003, ACM, VRST03, Oct. 1-3.*

(Continued)

*Primary Examiner* — Brandon Hoffman
*Assistant Examiner* — Samuel Ambaye
(74) *Attorney, Agent, or Firm* — Pauley Petersen & Erickson

(57) ABSTRACT

A method of securing against an unauthorized transmission within an authorized multimedia transmission from a sending data processor to a receiving data processor. The method includes altering the network transmission to interfere with the unauthorized transmission and render the unauthorized transmission invalid to the receiving data processor while not noticeably interfering with the streaming multimedia transmission. Monitoring for retransmissions or retransmission requests also serves as an indicator to an administrator that an unauthorized transmission is occurring. The method of this invention can be implemented by network administrator middleboxes such as firewalls.

21 Claims, 2 Drawing Sheets

U.S. PATENT DOCUMENTS

| | | |
|---|---|---|
| 2005/0122958 A1 | 6/2005 | Shim et al. |
| 2005/0198499 A1* | 9/2005 | Salapaka et al. ............. 713/160 |
| 2005/0281284 A1 | 12/2005 | Shim et al. |
| 2006/0069776 A1 | 3/2006 | Shim et al. |
| 2006/0120531 A1 | 6/2006 | Semple et al. |
| 2006/0154620 A1 | 7/2006 | Shima |
| 2006/0190993 A1* | 8/2006 | Noble ............................ 726/3 |
| 2006/0218395 A1 | 9/2006 | Maes |
| 2007/0058601 A1 | 3/2007 | Davis et al. |

OTHER PUBLICATIONS

Illinois Institute of Technology, *Securing the RTP Stream . . . "Slaying Steganography"*, Jun. 21, 2005, IEEE Communications Society, Fox Valley Subsection and IIT Rice Campus.

* cited by examiner

METHOD FOR SECURING STREAMING MULTIMEDIA NETWORK TRANSMISSIONS

BACKGROUND OF THE INVENTION

This invention relates generally to a method of securing against the theft of data or other service fraud by hiding the data within an electronic message or transmission and, more particularly, a method for securing against service fraud through an authorized multimedia transmission, such as Voice over Internet Protocol (VoIP) transmissions or Internet Protocol Television (IPTV).

Recently VoIP has been growing in popularity. VoIP provides many benefits including the capability for large conference sizes with the addition of a conference gateway, the capability for coordination among numbers of individuals, providing a single-cross organization, cross-boundary communications medium. VoIP is rapidly deployable and provides a single connection medium for voice, data, and video. Many companies and even the Federal government are adopting VoIP and moving to an IP network for converged communications.

However, VoIP has a significant security issue. Transmission channel access cannot be fully controlled or blocked to be fully operational, usable, and compatible with current telephony. Also, because everything is "data," conventional detection (similar to virus and spyware detection programs) has major difficulties distinguishing between voice, video, or other data information found in the transmissions. Unlike already well-known virus and spyware, there are no clear distinguishing markers or signatures. Data and executables move without inspection through the VoIP media port in firewalls. Deep packet inspection of the transmission is generally impossible because the introduced delay would be unacceptable. Thus data, executables, spy programs, and/or Trojan horses, for example, can generally be smuggled in or out without inspection or possibility of inspection.

Currently, VoIP often provides an unchecked channel to the migration of computer data and executables. VoIP provides hackers, thieves, spies, and computer system terrorists with an unchecked, open channel to steal data, e.g., files and databases, plant executables with the means for unchecked distribution to other systems, and/or destroy computer system infrastructure. Governments and companies that have switched to VoIP for the significant benefits VoIP provides could find that a hacker, spy, or terrorist could have stolen valuable information or planted an executable that could damage or destroy computer systems.

Detection of hidden data in real-time within VoIP or other streaming media transmissions is difficult because inspections of the transmissions consume too much time and delay the transmission. A key requirement for an application that creates or processes streams of audio and/or video is that the delay be kept to a minimum, in order to recreate the real-time experience. Detecting hidden data in a media stream is even more difficult when the stream is encrypted.

There is a need for a way to secure against the smuggling of unauthorized transmission within an authorized multimedia transmission, such as VoIP call.

SUMMARY OF THE INVENTION

A general object of the invention is to provide method of preventing the smuggling of unauthorized transmissions in authorized network transmissions, such as a VoIP call.

A more specific objective of the invention is to overcome one or more of the problems described above.

The general object of the invention can be attained, at least in part, through a method of securing against an unauthorized transmission within an authorized network transmission from a sending data processor to a receiving data processor. The method comprises altering, e.g., automatically with a computer, the network transmission to interfere with the unauthorized transmission and render the unauthorized transmission invalid to the receiving data processor.

The method of this invention prevents the hiding of computer data or executables behind the headers of, for example, RTP protocol data units, i.e., packets or datagrams, that are typically created for VoIP or other multimedia transmissions. Generally, the data behind these headers is a group of bytes, i.e., payload or body, that represent voice or video. The payloads are played at the receiving end as a stream of audio and/or video. The method of this invention prevents someone from hiding computer data or an executable where the voice and video is or should be.

Unlike known techniques, the method of this invention does not require the inspection of the packets behind the headers. As discussed above, such inspection undesirably causes too much delay in the multimedia stream. The method of this invention does not add human-appreciable delay. Also, unlike the method of this invention, known techniques for inspection of the body of the RTP message typically involve considerable amounts of processing power and decision-making.

The present invention includes a method for processing and altering the data packets of an authorized transmission in such a way that they can be played back to the receiver without noticeable degradation in the quality. Characteristics of audio, video, and the codecs used to encode them allow for such an alteration. When an unauthorized data file, such as a spreadsheet, database, or executable, is hidden within the media transmission, the alteration also affects the hidden file and renders that file useless, i.e., it cannot be opened or executed by the receiving data processor.

The method of this invention can be added to firewalls, intrusion and/or extrusion detection and prevention systems (IDS, IPS, etc.), RTP gateways, proxies, transcoders, application layer gateways (ALG), session border controllers (SBC), or other middleboxes, and enables them to prevent the misuse of a media stream for smuggling data or executables in or out of a computer. The method of this invention is particularly appropriate for encrypted media streams, as there often is no simple way to inspect encrypted content.

The invention further comprehends a method of securing against an unauthorized transmission within an authorized network transmission from a sending data processor to a receiving data processor. The method includes altering the network transmission to interfere with the unauthorized transmission and render the unauthorized transmission invalid to the receiving data processor, monitoring the authorized transmission for a retransmission request from the receiving data processor or a retransmission by the sending data processor, and signaling, e.g., to an administrator, a potential unauthorized data transmission when the retransmission request or the retransmission is detected. The method is desirably automatically performed by a computer.

The invention still further comprehends a method of securing against an unauthorized transmission within an authorized network transmission including multimedia content of at least one of voice and video from a sending data processor to a receiving data processor. The method comprises dividing the network transmission into a plurality of packets, each of the plurality of packets including a header and a payload, routing the network transmission through a middlebox, often controlled by an administrator of the sending data processor, and altering at least one of the plurality of packets using the middlebox to interfere with the unauthorized transmission and render the unauthorized transmission invalid to the receiving data processor.

As used herein, references to "middlebox" are to be understood to refer to an intermediate device or software in a network, such as the Internet, that provides transport policy enforcement.

Further, references herein to "RTP" or "real-time transport protocol" are to be understood to refer to an Internet-standard protocol for the transport of real-time data, including audio and video. RTP is used in voice-over-IP architectures, for videoconferencing, media-on-demand, and other applications. RTP is a packet based communication protocol that adds timing and sequence information to each packet to allow the reassembly of packets to reproduce real time audio and video information. RTP is a transport used in IP audio and video environments. RTP is designed to provide end-to-end network transport functions for applications transmitting real-time data, such as audio, video, or simulation data, over multicast or unicast network services.

References herein to "UDP" or "user datagram protocol" are to be understood to refer to a communication protocol that coordinates the one-way transmission of data in a packet data network. The UDP protocol utilizes the division of files or blocks of data information into packets that are transmitted during a communication session using Internet Protocol (IP) addressing. This allows the receiving end to receive and, with its best effort, recreate the original data file or block of data that was transmitted. UDP is used for real-time audio and video traffic where lost packets are simply ignored, because there is no time to retransmit.

A "packet" includes three elements. The first element is a header, which marks the beginning of the packet. The second element is a data area or payload, which contains the information to be carried in the packet. The third element of a packet is a trailer, which marks the end of the packet.

Other objects and advantages will be apparent to those skilled in the art from the following detailed description taken in conjunction with the appended claims and drawings.

DETAILED DESCRIPTION OF THE INVENTION

The present invention provides a method of securing against an unauthorized transmission within an authorized network transmission from a sending data processor to a receiving data processor. This invention also contemplates hardware and software for implementing the method. The invention will be described below with particular reference to a Voice over Internet Protocol (VoIP) transmission; however the method of this invention is not intended to be so limited. The method of this invention can be applied to, for example, streaming video or other network transmissions.

Figure 1:
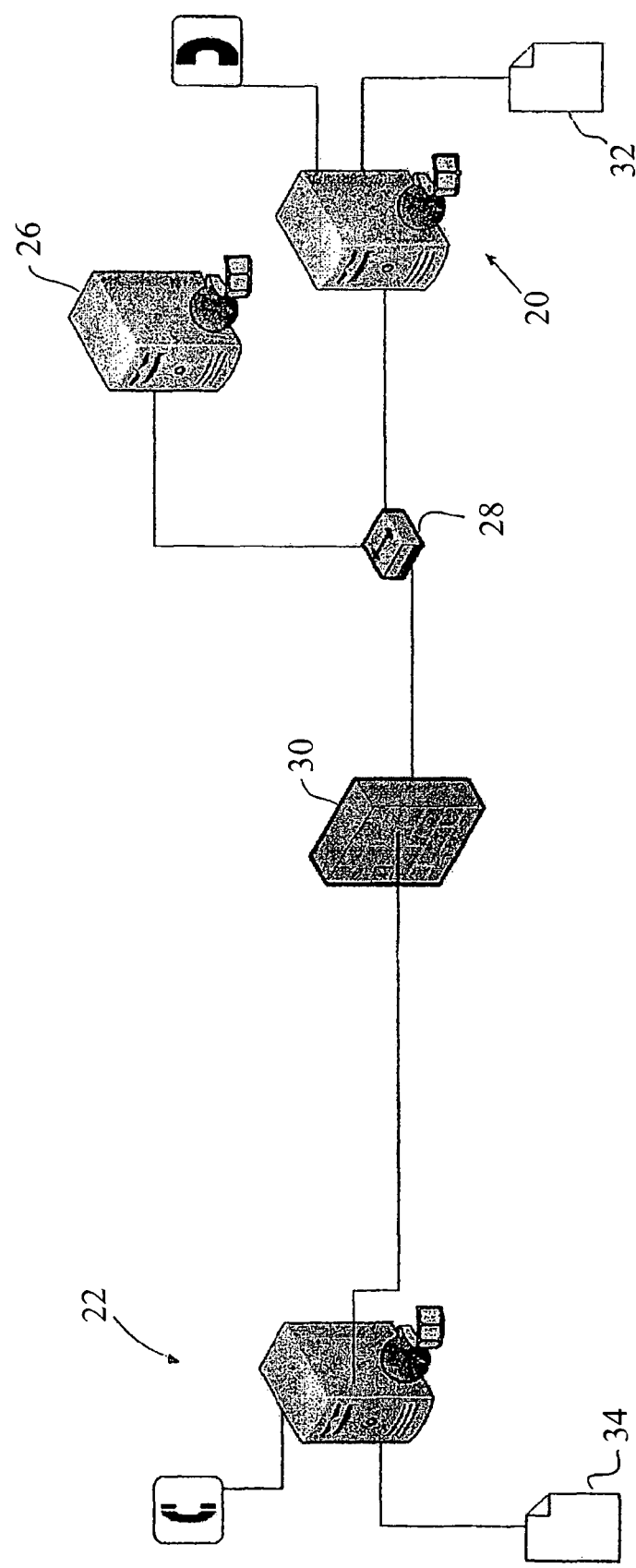
FIG. 1 is a simple schematic that illustrates a system for implementing the method of one embodiment of this invention.

FIG. 1 is a simple schematic that illustrates the implementation of the method of one embodiment of this invention. In FIG. 1, a sending data processor 20, e.g., a SIP (Session Initiation Protocol) phone, is used to make a VoIP call to a receiving data processor 22. The sending data processor 20 is shown as part of a network including SIP proxy server 26, hub 28, and firewall middlebox 30.

Without implementing the method of this invention, a user of the sending data processor is able to send a data file 32 as an unauthorized transmission within an otherwise authorized VoIP call to be received as data file 34 by the receiving data processor 22. Currently, firewalls and other security hardware or software generally cannot provide sufficient monitoring of the VoIP data transmission to detect for and/or filter out the unauthorized data file 32, as such an inspection would introduce delay and interfere with the communication of the transmission. Typically, a firewall will inspect only the headers of a VoIP transmission and not perform a deep packet inspection, thereby not noticing unauthorized data hidden in the packets.

In one embodiment of the method of this invention, the network transmission is altered to interfere with the unauthorized transmission and render the unauthorized transmission invalid to the receiving data processor. The alteration according to this invention renders the data file 32 invalid to the receiving computer 22, while the media content of the network transmission is still understandable by the receiving data processor 22. The alteration desirably includes changing data bits in the transmission, or either adding or deleting bits, and can be done by the firewall 30, or other similar middlebox hardware, such as a conference server, a gateway, a proxy or a router, or software executable thereon.

Internet standard protocols, such as without limitation, UDP and RTP, for the transport of real time data, such as voice and video, generally separate the data transmission into packets. Common data packets generally include a header at the beginning, a payload (data) area, and a trailer marking the end of the packet. In one embodiment of this invention, the network transmission is altered by adding, deleting, or changing data bits in the payload of one or more of the plurality of packets. These alterations can be random or selective, such as changing, deleting, or adding a packet after every predetermined number of packets along the network transmission. In one embodiment, adding packets to the network transmission is obtained by randomly or selectively duplicating packets or packet payload data along the network transmission.

Instead of attempting to actively inspect the data that flows through the port, the method of this invention damages or manipulates the data in a way that has little affect on the authorized media stream, but renders any unauthorized piggybacking computer data, databases, and/or executables unusable. The method of this invention is effective because, for example, voice and data have different receivers with different tolerances. Human generally can tolerate errors and missing data packets, and data damaging according to this invention can go virtually unnoticed by humans. Computers, on the other hand, generally have a low tolerance for errors and missing data packets. For example, a computer executable typically will not run if damaged. The method of this invention damages and/or manipulates VoIP or other media stream data without a significant degradation to the signal intelligibility as perceived by the receiver, e.g., a human user.

In one embodiment of this invention, the authorized media content of the damaged and/or manipulated transmission can be repaired. Damaged voice and video can be reconstructed, or noises, e.g., clicks and pops, can be removed from an analog signal. For example, video data often has an overlap between adjacent video frames of about 95% redundancy. However, other (i.e., not streaming media having analog representation) computer data and executables generally follow no predictable patterns and cannot be reconstructed.

Figure 2:
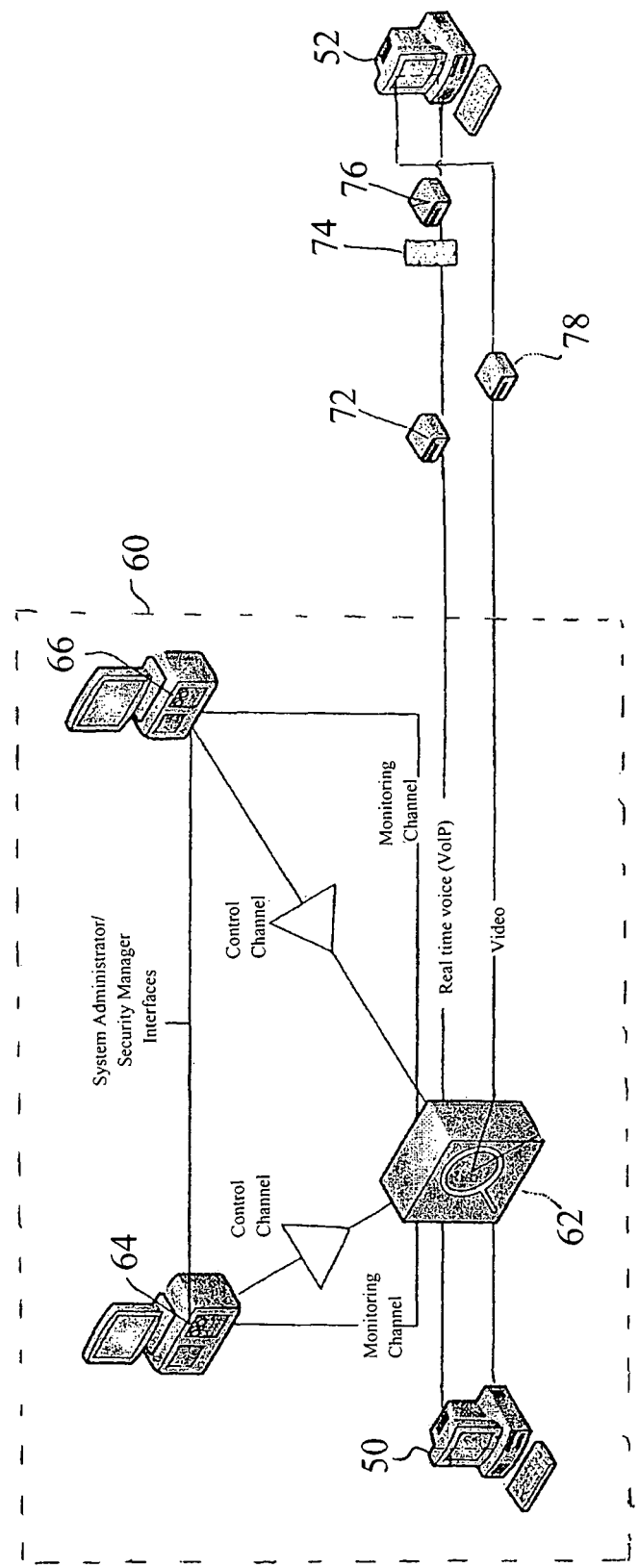
FIG. 2 is a schematic overview that illustrates a system for implementing the method of another embodiment of this invention.

FIG. 2 is another schematic overview that illustrates the implementation of the method of another embodiment of this invention for securing against an unauthorized transmission within an authorized network transmission. In the embodiment shown in FIG. 2, a sending computer 50 is used to send an authorized network media transmission of at least one of voice and video over the Internet to a receiving computer 52. The authorized transmission is divided for transmitting into a plurality of packets, e.g., RTP or UDP packets, each including at least a header and a payload. The user of the sending computer 50, or someone having access to the sending computer 50 and/or the authorized transmission, hides an unauthorized transmission, e.g., data to be smuggled out of a company system, in the payload of the packets. Generally, the unauthorized transmission will also be partitioned into the packets, with each payload including a portion of the smuggled data.

In the embodiment shown in FIG. 2, the sending computer 50 is part of an intranet network system 60, such as, for example, a company or government network system. The system 60 includes a middlebox 62, as well as optional intrusion and extrusion detection system 64 and stream behavior analysis system 66, such as are known and available to those skilled in the art. The authorized media transmission is routed from the sending computer 50 to and through the middlebox 62, which is controlled by an administrator of the system 60. In one embodiment of this invention, the middlebox 62, which can be, for example, a firewall, conference server, gateway, proxy or router, alters the network transmission, such as described above, to interfere with the unauthorized transmission and render the unauthorized transmission invalid to the receiving computer 52.

The middlebox 62 alters the authorized transmission by selectively or randomly adding, deleting, or changing data bits in the payload of one or more of the plurality of packets. The altered media transmission leaves the middlebox 62 and is routed over the Internet to the receiving computer 52. In one embodiment of this invention, the receiving computer 52 can repair the altered authorized media transmission. In FIG. 2, a digital voice repairer 72 can be used to repair the voice stream based upon, for example, predictive redundancies of voice that are not present in the unauthorized data stream. Digital repair is performed before digital to analog conversion 74, but the same or similar result can be obtained by an analog voice repairer 76. Similarly, a video repairer 78, e.g., a digital video repairer, can repair video media streams based upon predictive redundancies in video streams that are not present in unauthorized data streams.

Of course, implementing the security measures of this invention would invite adaptations to circumvent the method. For example, upon receiving the altered unauthorized transmission within the authorized transmission, the receiving computer 52 may initiate a request to the sending computer 50 to retransmit the unauthorized transmission. Another possibility is where the sender and/or sending computer 50 are aware of the altering of the unauthorized transmission, and the sending computer 50 retransmits the unauthorized transmission at least once during the authorized transmission. The purpose of both of these actions is to attempt to transmit all portions of the unauthorized transmission through more than one transmission. By retransmitting the unauthorized transmission, the middlebox 62 may not remove or otherwise affect the same bits of the unauthorized transmission. The receiving computer 52 receives all the data bits of the unauthorized transmission through more than one hidden transmission, and reconstructs the unauthorized transmission from the multiple incomplete or otherwise imperfect transmissions.

The system 60 desirably monitors for such data retransmission requests and/or disallows retransmissions of data. In one embodiment of this invention, the system monitors the authorized transmission for a retransmission request from the receiving computer 52 or a retransmission by the sending computer 50 and signals the administrator of system 60 of a potential unauthorized data transmission when the retransmission request or the retransmission is detected. The middlebox 62, alone or in combination with the intrusion and extrusion detection system 64 and/or stream behavior analysis system 66, desirably monitors for retransmissions and/or requests therefore. As multimedia content doesn't typically use retransmissions or retransmission requests, these activities can indicate that something other than multimedia including voice or video is present in the transmission.

The method of this invention can desirably be used in conjunction with other available data detection methods. For example, in one embodiment of this invention, a passive detection method, such as may be implemented by system 64, continually or periodically monitors VoIP transmissions to determine if any computer data or executables are being moved across a VoIP channel. If an unauthorized transmission is suspected, the VoIP transmission can be altered according to this invention, or the level of altering can be increased. By increasing the alterations of the VoIP transmission, more interference in the voice signal may result. However, the interference is generally preferred over the alternative of, for example, the system 60 terminating the call. By reducing the need to terminate suspected calls, the method of this invention can reduce the harm of false positives on callers.

Thus, the invention provides a method for simply and efficiently securing against service fraud and/or theft of data through an authorized multimedia transmission, such as Voice over Internet Protocol (VoIP) transmissions. By not actively inspecting the transmission for unauthorized add-ons before altering the transmission, this invention does not introduce appreciable unwanted delay and/or jitter to the media transmission. Also, the level of alteration can be adjusted, and can be implemented without causing appreciable degradation in the intended transmission.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of securing against an unauthorized transmission within an authorized network transmission from a sending data processor to a receiving data processor, the method comprising:

altering voice data content or video data content of network transmission sent by the sending data processor to interfere with any unknown unauthorized transmission within the voice data content or the video data content of one or more of the network transmissions and render the any unknown unauthorized transmission invalid to the receiving data processor, wherein each of the network transmissions is altered after being sent, and the network transmissions that are altered include network transmissions that do not include any unauthorized transmission therewithin.

2. The method of claim 1, wherein the altered voice data content or video data content of the network transmission is understandable by the receiving data processor.

3. The method of claim 2, further comprising repairing the altered voice data content of the network transmission.

4. The method of claim 1, wherein altering the network transmission comprises changing voice data bits or video data bits in the network transmission.

5. The method of claim 4, further comprising removing voice data bits or video data bits from or adding data bits to the network transmission.

6. The method of claim 1, wherein altering the network transmission occurs at a middlebox between the sending data processor and the receiving data processor.

7. The method of claim 6, wherein the middlebox comprises a firewall, conference server, gateway, proxy or router.

8. The method of claim 1, wherein each of the network transmission comprises a plurality of packets and each packet comprises a header and a payload, including the voice data content or video data content, and further comprising adding, deleting, or changing voice data bits or video data bits in the payload of one or more of the plurality of packets.

9. The method of claim 1, wherein each of the network transmissions comprises a plurality of packets and further comprising randomly or selectively deleting packets including the voice data content or video data content from the network transmissions.

10. The method of claim 1, wherein each of the network transmission comprises a plurality of packets and further comprising adding packets into the network transmission.

11. The method of claim 10, further comprising duplicating packets or packet payload data along the network transmission.

12. The method of claim 1, wherein each of the network transmission comprises a plurality of packets including the voice data content or video data content and further comprising changing, deleting, or adding a packet to the network transmission after every predetermined number of the plurality of packets including the voice data content or video data content along the network transmissions.

13. The method of claim 1, further comprising monitoring for data retransmission requests and disallowing retransmission of data.

14. The method of claim 1, wherein each of the network transmissions comprises a media content, and further comprising monitoring the network transmissions for data other than the media content and altering the voice data content or video data content of the network transmission upon identifying the data other than the media content.

15. Middlebox hardware or software implementing the method of claim 1.

16. The middlebox of claim 15, wherein the middlebox comprises a firewall, conference server, gateway, proxy or router.

17. A method of securing against an unauthorized transmission within an authorized network transmission from a sending data processor to a receiving data processor, the method comprising:
altering multimedia content data of at least one of voice data or video data in an authorized streaming network transmission by changing, deleting, or adding voice data bits or video data bits in the network transmission after the authorized streaming network transmission is sent by the sending data processor to interfere with any unknown unauthorized transmission and render the any unknown unauthorized transmission invalid to the receiving data processor;
monitoring for a retransmission request for the authorized streaming network transmission from the receiving data processor or a retransmission of the authorized streaming network by the sending data processor; and
signaling a potential unauthorized data transmission when the retransmission request or the retransmission is detected.

18. The method of claim 17, wherein a middlebox monitors the authorized transmission for the retransmission request and signals a potential unauthorized data transmission when a retransmission request is detected.

19. A method of securing against an unknown unauthorized transmission within authorized network transmissions from a sending data processor to a receiving data processor, the method comprising:
receiving the network transmissions sent by the sending data processor in a middlebox controlled by an administrator of the sending data processor, the network transmissions each comprising of a plurality of packets including multimedia content of at least one of voice data or video data, each of the plurality of packets including a header and a payload;
rendering any unknown unauthorized transmission within the network transmissions invalid to the receiving data processor by altering voice data bits or video data bits of the at least one of voice data of at least one of the plurality of packets of the network transmission using the middlebox, the network transmissions that are altered including transmissions that do not include any unauthorized transmission therewithin.

20. The method of claim 19, further comprising:
monitoring for a retransmission request from the receiving computer with the middlebox; and
signaling to the administrator a potential unauthorized data transmission when a retransmission request is detected.

21. A method of securing against an unauthorized transmission within an authorized network transmission from a sending data processor to a receiving data processor, the method comprising:
altering voice data or video data of streaming voice data or video data transmissions sent by the sending data processor to render invalid data processor any hidden unauthorized transmission within one or more of the streaming voice data or video data transmissions, the streaming voice data or video data transmissions that are altered including voice data or video data transmissions that do not include any unauthorized transmission therewithin.

* * * * *